(12) United States Patent
Mifune et al.

(10) Patent No.: US 10,718,895 B2
(45) Date of Patent: Jul. 21, 2020

(54) ILLUMINATING DEVICE

(71) Applicant: Japan Display Inc., Minato-ku (JP)

(72) Inventors: Masayuki Mifune, Tokyo (JP); Makoto Miyao, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/581,970

(22) Filed: Sep. 25, 2019

(65) Prior Publication Data

US 2020/0018893 A1    Jan. 16, 2020

Related U.S. Application Data

(63) Continuation of application No. 16/299,519, filed on Mar. 12, 2019, now Pat. No. 10,481,322, which is a
(Continued)

(30) Foreign Application Priority Data

Aug. 7, 2015   (JP) .................................. 2015-157022

(51) Int. Cl.
  *F21V 7/04*   (2006.01)
  *F21V 8/00*   (2006.01)

(52) U.S. Cl.
  CPC ........... *G02B 6/0088* (2013.01); *G02B 6/009* (2013.01); *G02B 6/0055* (2013.01);
(Continued)

(58) Field of Classification Search
  CPC .. G02B 6/0088; G02B 6/0068; G02B 6/0055; G02B 6/0073; G02B 6/0085;
(Continued)

(56) References Cited

U.S. PATENT DOCUMENTS 9,763,346 B2 *  9/2017  Li ........................ H05K 5/0017
2014/0125913 A1  5/2014  Lee et al.
(Continued)

FOREIGN PATENT DOCUMENTS

JP   2001-356342   12/2001
JP   2007-102136    4/2007
(Continued)

OTHER PUBLICATIONS

Office Action dated May 7, 2019 in Japanese Application No. 2015-157022 (w/English translation).
(Continued)

*Primary Examiner* — Ali Alavi
(74) *Attorney, Agent, or Firm* — Oblon, McClelland, Maier & Neustadt, L.L.P.

(57)    ABSTRACT

According to one embodiment, an illuminating device includes a lightguide plate including a curved emitting surface, and an incidence surface including a side edge curved along the emitting surface, a printed circuit board facing the incidence surface, and light sources mounted on the printed circuit board. Each light source includes a light-emitting center, a pair of connection terminals, and a central axis extending through the connection terminals and the light-emitting center. The light sources are arranged along a curved mounting line extending along the curved side edge of the incidence surface on the printed circuit board. The light-emitting centers are located on the mounting line, and the central axes are parallel to each other.

18 Claims, 8 Drawing Sheets

Related U.S. Application Data continuation of application No. 15/202,973, filed on Jul. 6, 2016, now Pat. No. 10,267,980.

(52) U.S. Cl.
CPC ......... *G02B 6/0068* (2013.01); *G02B 6/0073* (2013.01); *G02B 6/0085* (2013.01); *G02B 6/0091* (2013.01)

(58) Field of Classification Search
CPC ......... G02F 1/133608; G02F 1/133603; G02F 1/133615; G02F 2001/133612
USPC ........................................... 362/606
See application file for complete search history.

(56) References Cited

U.S. PATENT DOCUMENTS

| | | |
|---|---|---|
| 2014/0168564 A1 | 6/2014 | Lee |
| 2014/0307474 A1 | 10/2014 | Kim |
| 2015/0130775 A1* | 5/2015 | Kim .................... H04N 5/64 345/205 |
| 2016/0057850 A1* | 2/2016 | Kang ............... G02F 1/133308 361/749 |
| 2016/0295711 A1* | 10/2016 | Ryu ...................... G09F 9/301 |
| 2018/0120494 A1* | 5/2018 | Yoo ..................... G02B 6/0025 |

FOREIGN PATENT DOCUMENTS

| | | |
|---|---|---|
| JP | 2008-171797 | 7/2008 |
| JP | 3156238 U | 12/2009 |
| JP | 2015-29081 | 2/2015 |
| WO | WO 2012/081504 A1 | 6/2012 |

OTHER PUBLICATIONS

Japanese Office Action dated Oct. 23, 2019, in Patent Application No. 2015-157022, 15 pages (with unedited computer generated English translation).

* cited by examiner

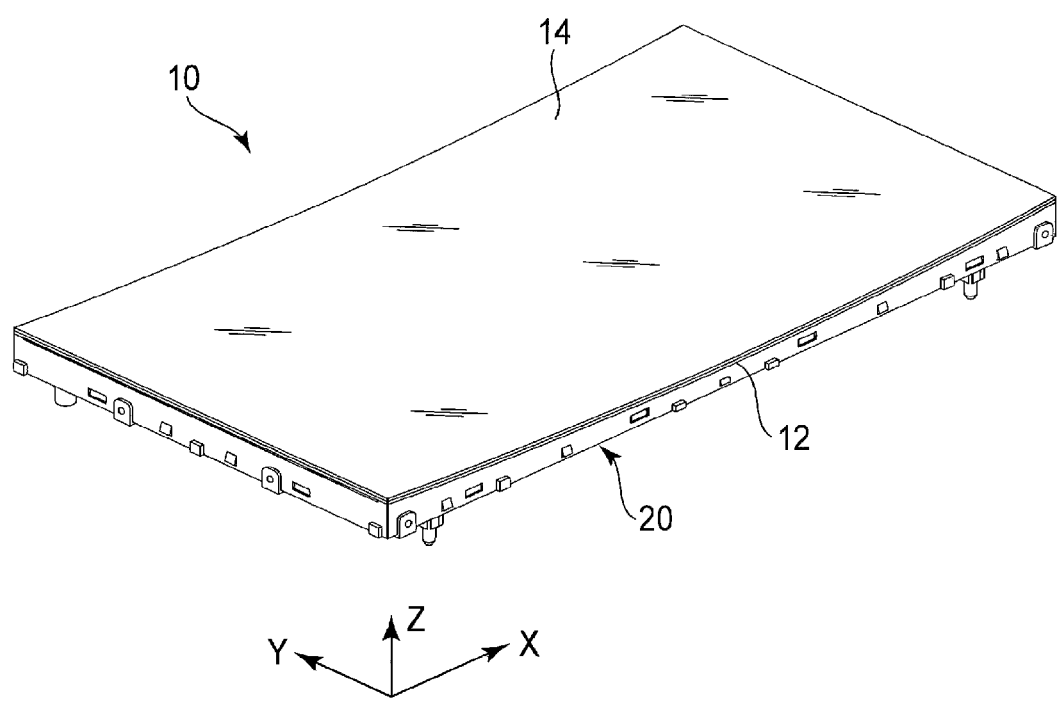
F I G. 1

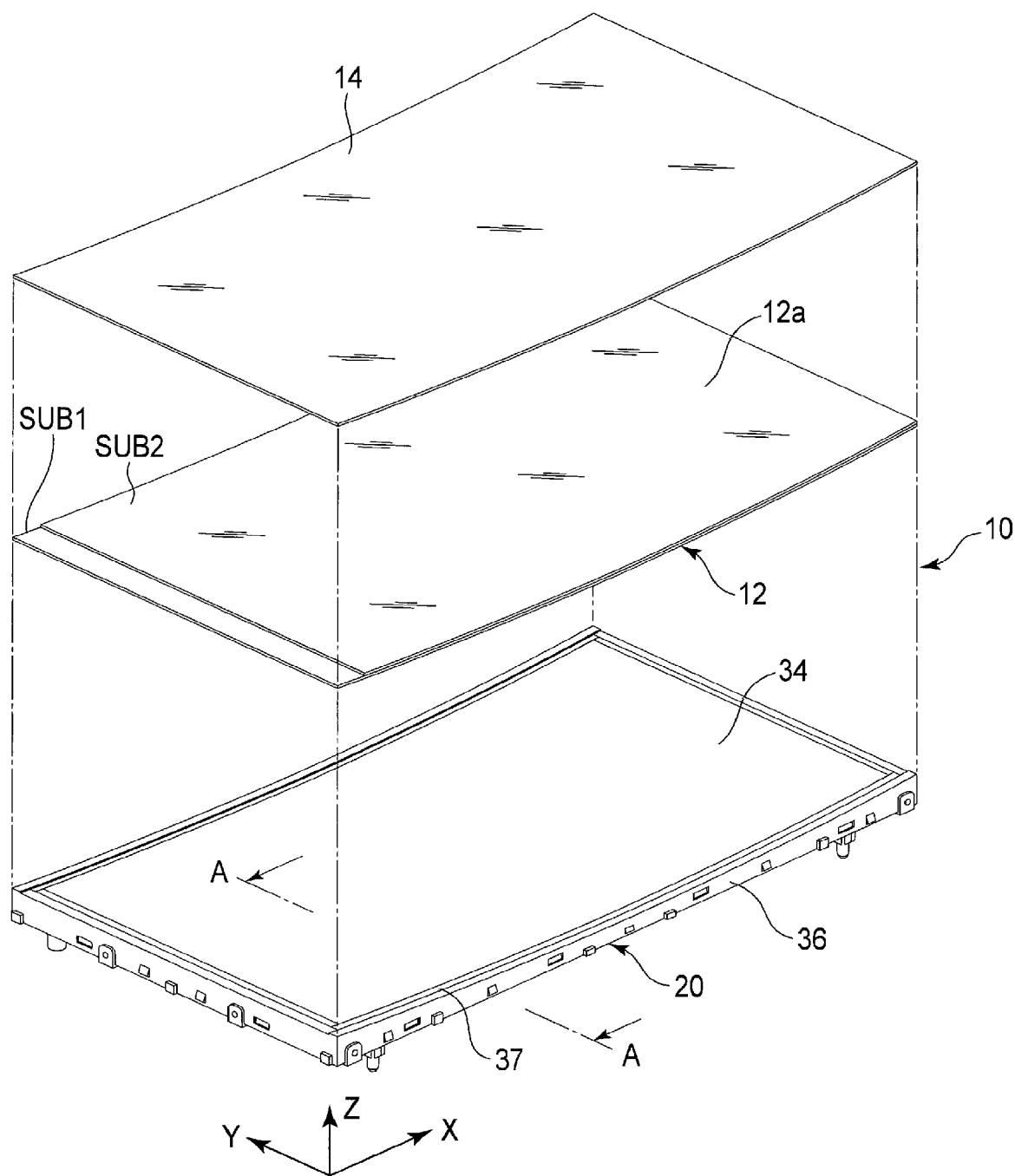
F I G. 2

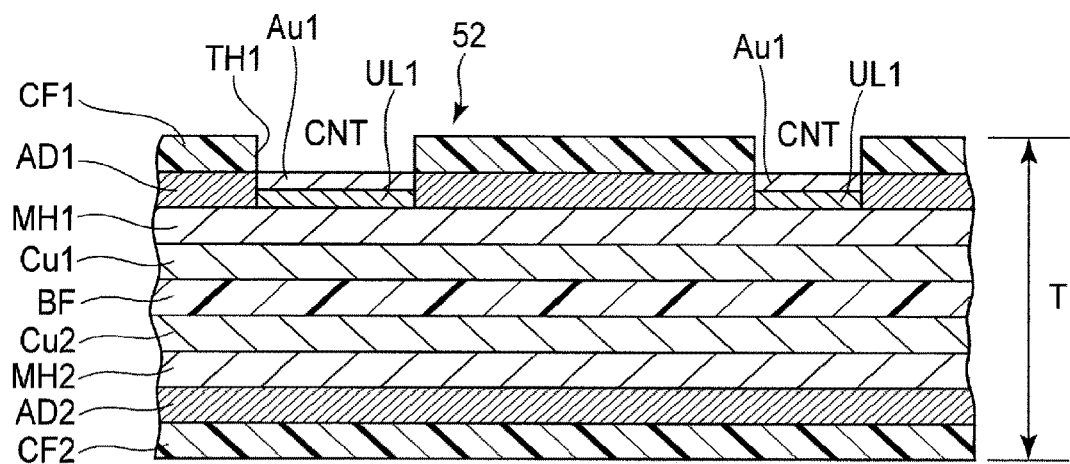
F I G. 5
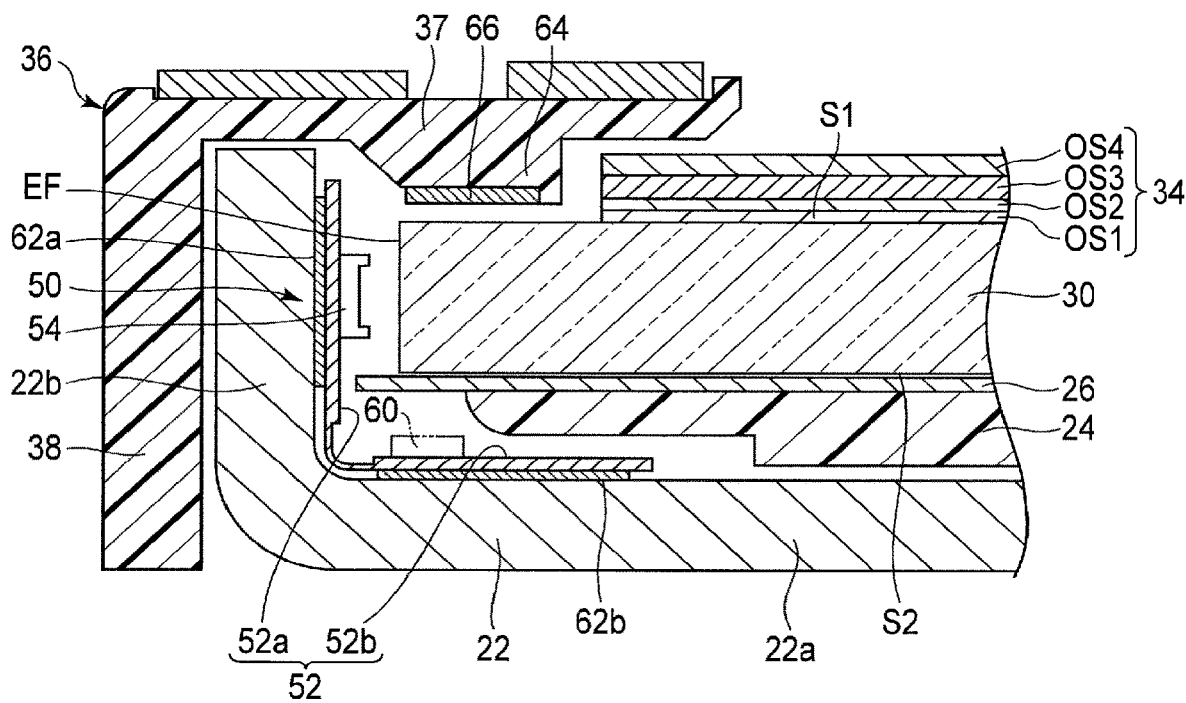
F I G. 6

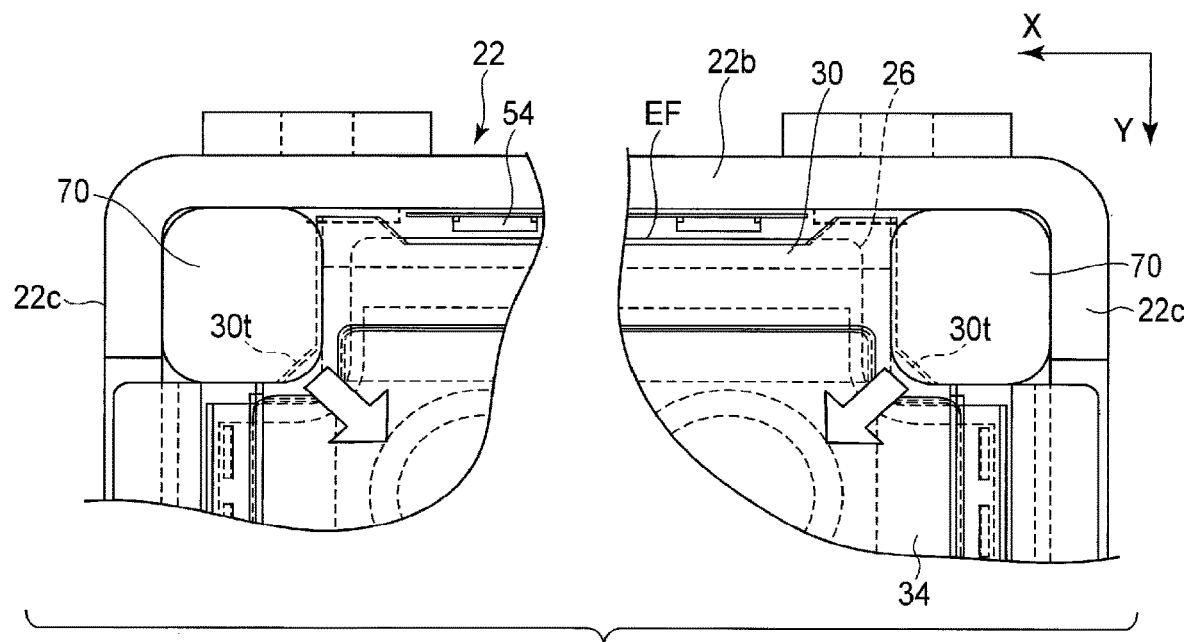
F I G. 8
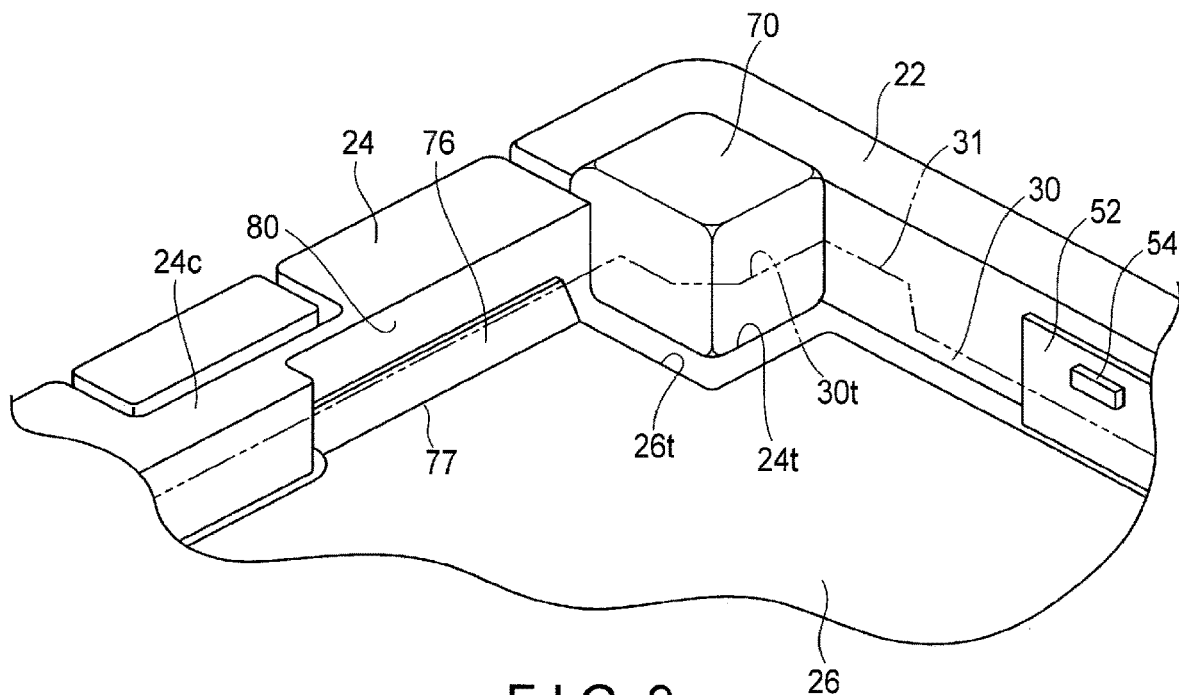
F I G. 9

ILLUMINATING DEVICE

CROSS-REFERENCE TO RELATED APPLICATIONS

This application is a continuation of and claims the benefit of priority under 35 U.S.C. § 120 from U.S. application Ser. No. 16/299,519 filed Mar. 12, 2019, which is a continuation of U.S. application Ser. No. 15/202,973 filed Jul. 6, 2016 (now U.S. Pat. No. 10,267,980 issued Apr. 23, 2019), and claims the benefit of priority under 35 U.S.C. § 119 from Japanese Patent Application No. 2015-157022 filed Aug. 7, 2015, the entire contents of each of which are incorporated herein by reference.

FIELD

Embodiments described herein relate generally to an illuminating device.

BACKGROUND

Currently, liquid crystal display devices are widely used in portable devices such as smartphones and tablet computers, or in in-vehicle equipment. In general, a liquid crystal display device comprises a liquid crystal display panel and an illuminating device which is provided on the rear surface side of the liquid crystal display panel and illuminates the liquid crystal display panel. The liquid crystal display panel is a flat panel, and the illuminating device has a planar structure such that the light emitting surface is also flat.

However, such a flat display device is difficult to combine or integrate with the interior arrangement, for example, a complicated shape based on curved surfaces. Thus, the flat display device is restricted in terms of design.

BRIEF DESCRIPTION OF THE DRAWINGS

FIG. 1 is a perspective view showing the display side of a liquid crystal display device according to a first embodiment.

FIG. 2 is an exploded perspective view of the liquid crystal display device.

FIG. 5 is a cross-sectional view schematically showing the stacked structure of the printed circuit board.

FIG. 6 is a cross-sectional view of the planar illuminating device along the line A-A of FIG. 2.

FIG. 8 is a plan view in which corner portions of the planar illuminating device are enlarged.

FIG. 9 is a perspective view schematically showing a corner portion of the planar illuminating device.

DETAILED DESCRIPTION

Figure 3:
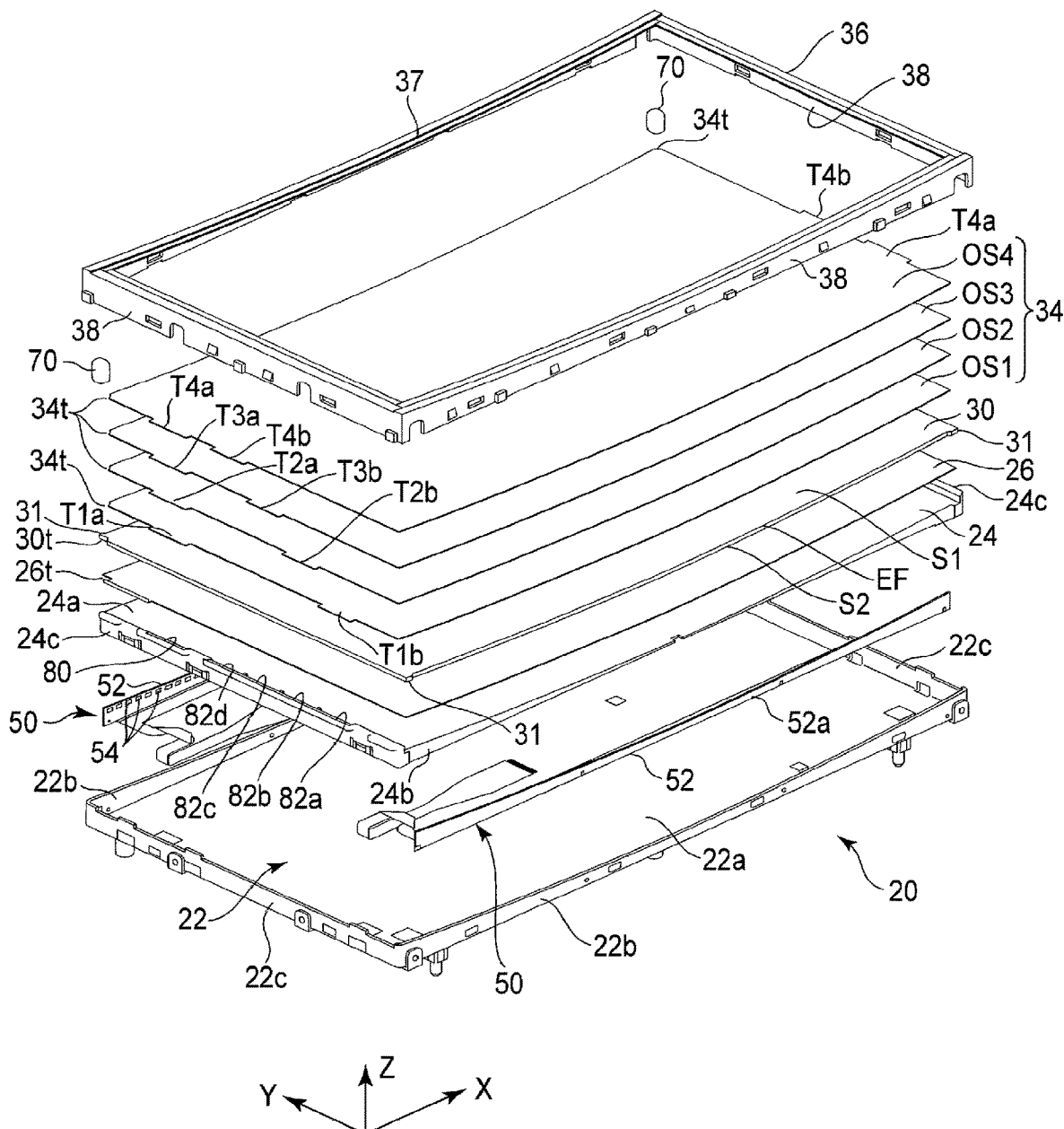
FIG. 3 is an exploded perspective view of a planar illuminating device of the liquid crystal display device.

Various embodiments will be described hereinafter with reference to the accompanying drawings. In general, according to one embodiment, an illuminating device comprises: a lightguide plate comprising a curved emitting surface, and an incidence surface comprising a side edge curved along the emitting surface; a printed circuit board facing the incidence surface; and a plurality of light sources which are mounted on the printed circuit board and emit light to the incidence surface. Each of the light sources comprises a light-emitting center, a pair of connection terminals connected to the printed circuit board, and a central axis extending through the connection terminals and the light-emitting center. The light sources are arranged along a curved mounting line extending along the curved side edge of the incidence surface on the printed circuit board, such that the light-emitting centers are located on the mounting line, and such that the central axes are parallel to each other and are located in a direction intersecting with the mounting line.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

FIG. 1 is a perspective view showing the display side of a liquid crystal display device according to the present embodiment. FIG. 2 is an exploded perspective view of the liquid crystal display device.

The liquid crystal display device 10 may be used when it is incorporated into various electronic devices such as a smartphone, a tablet, a mobile phone, a portable game console, an electronic dictionary or a television device, or in-vehicle devices such as a navigation system or a meter panel.

As shown in FIG. 1 and FIG. 2, the liquid crystal display device 10 comprises an active-matrix liquid crystal display panel 12, a transparent cover panel 14 overlapped with a display surface 12a of a liquid crystal display panel 12 in order to cover the display surface 12a as a whole, and a planar illuminating device 20 facing the rear surface of the liquid crystal display panel 12. The planar illuminating device 20 illuminates the liquid crystal display panel 12 from the rear side with planar light.

The liquid crystal display panel 12 is, for example, rectangular and curved in the long-axial direction. In the present embodiment, the long sides of the liquid crystal display panel 12 are curved so as to be concave to the planar illuminating device 20 side. The display surface 12a forms a curved surface which is concave to the planar illuminating device 20 side. The display surface 12a is curved so as to be deepest in the central portion in the longitudinal direction and be highest at the positions of the two short sides. The heights of the positions of the two short sides are the same as each other.

The liquid crystal display panel 12 comprises an array substrate SUB1 in the form of a rectangular plate, a counter-substrate SUB2, also in the form of a rectangular plate, facing the array substrate SUB1, and a liquid crystal layer (not shown) held between the array substrate SUB1 and the counter-substrate SUB2. The liquid crystal display panel 12 is a transmissive display panel having a transmission display function for displaying an image by selectively transmitting light emitted from the illuminating device 20. The liquid crystal display panel 12 may be a semi-transmissive display panel having a transmission display function and a reflective display function. The liquid crystal display panel 12 may have a structure mainly corresponding to, as a display mode, a transverse electric field mode using a transverse electric field that is substantially parallel to the main surface of the substrate, or may have a structure mainly corresponding to a vertical electric field mode using a vertical electric field that is substantially perpendicular to the main surface of the substrate. The liquid crystal display panel 12 may be a display panel which comprises a touch sensor (not shown) to allow touch input.

The cover panel 14 has the shape of a rectangular plate and is formed of glass or transparent acrylic resin, etc. The cover panel 14 is wider and longer than the liquid crystal display panel 12, and is larger than the liquid crystal display panel in a planar aspect. The cover panel 14 is curved, having the same curvature as the liquid crystal display panel 12 in the longitudinal direction. The lower surface (rear surface) of the cover panel 14 is attached to the display surface 12*a* of the liquid crystal display panel 12 by, for example, a transparent adhesive, and covers the entire surface of the liquid crystal display panel 12.

Now, this specification explains the details of a structural example of the planar illuminating device 20. FIG. 3 is an exploded perspective view of the planar illuminating device. As shown in FIG. 2 and FIG. 3, the planar illuminating device 20 has the shape of a rectangular plate having substantially the same dimensions as the liquid crystal display panel 12 as a whole. The planar illuminating device 20 comprises a metal base frame (storage portion) 22 in the form of a rectangular flat cover. The planar illuminating device 20 further comprises a resinous inner frame 24, a reflective sheet 26 and a lightguide plate 30. The resinous inner frame 24, the reflective sheet 26 and the lightguide plate 30 are stacked in order inside the base frame 22. The planar illuminating device 20 further comprises a plurality of optical sheets 34 stacked on the lightguide plate 30, and a rectangular outer frame 36. The planar illuminating device 20 is provided inside the base frame 22, and comprises two light source units 50 which emit light to the lightguide plate 30.

The base frame 22 is formed by applying folding or drawing to a metal plate such as an aluminum, stainless steel or iron plate. The base frame 22 comprises a rectangular flat bottom wall 22*a* which is longer and wider than the liquid crystal display panel 12 and is equal to or shorter and narrower than the cover panel 14, a pair of sidewalls 22*b* standing along the long side edges of the bottom wall 22*a*, and a pair of sidewalls 22*c* standing along the short side edges of the bottom wall 22*a*.

In the present embodiment, the sidewalls 22*b* standing along the long sides are substantially perpendicular to the bottom wall 22*a* and extend over the entire length of the long sides of the bottom wall 22*a*. The sidewalls 22*c* standing along the short sides are substantially perpendicular to the bottom wall 22*a* and extend over the entire length of the short sides of the bottom wall 22*a*. The upper border of each sidewall 22*b* along the long sides is curved in an arc-shape so as to be concave toward the bottom wall 22*a* with a curvature substantially equal to that of the curved surface of the liquid crystal display panel 12.

The inner frame 24 comprises a rectangular support plate 24*a*, a pair of sidewalls 24*b* standing on the long sides of the support plate, and a pair of sidewalls 24*c* standing along the short sides of the support plate, and is integrally formed by synthetic resin. The inner frame 24 is provided inside the base frame 22. The support plate 24*a* faces the bottom wall 22*a* of the base frame 22. The sidewalls 24*c* standing along the short sides engage with or are fitted with the sidewalls 22*c* of the base frame 22. The sidewalls 24*b* standing along the long sides face the respective sidewalls 22*b* of the base frame 22 across an intervening space for providing the respective light source units 50.

The support plate 24*a* of the inner frame 24 is curved in an arc-shape so as to be concave toward the base frame 22 in the longitudinal direction, and forms a curved support surface. The support plate 24*a* has a curvature substantially equal to that of the curved surface of the liquid crystal display panel 12.

The reflective sheet 26 is rectangular, having dimensions substantially equal to those of the inner frame 24. The reflective sheet 26 is placed on the support plate (support surface) 24*a* of the inner frame 24, and is curved along the support plate 24*a*.

In the present embodiment, the lightguide plate 30 is rectangular and of a uniform thickness, and has dimensions substantially equal to those of the support plate 24*a* of the inner frame 24. The lightguide plate 30 is placed on the reflective sheet 26, and is curved along the support plate 24*a*. The lightguide plate 30 may be in the form of a plate which is curved in advance. The lightguide plate 30 comprises a first main surface S1 which is rectangular and curved as an emitting surface, a second main surface S2 opposite to the first main surface S1, and a pair of side surfaces (incidence surfaces) EF connecting the long sides of the first main surface S1 to the long sides of the second main surface S2 along the long sides. The first main surface S1 has a curvature substantially equal to that of the liquid crystal display panel 12. Each incidence surface EF comprises upper and lower curved side edges which are concave so as to be lowest in the central portion in the longitudinal direction. The lightguide plate 30 is stacked on the reflective sheet 26 such that the second main surface S2 faces the reflective sheet 26.

Each optical sheet 34 has a light transmitting property, and is stacked on the first main surface (emitting surface) S1 of the lightguide plate 30. In the present embodiment, as the optical sheets 34, a diffusion sheet OS1 formed of synthetic resin such as polyethylene terephthalate, a prism sheet OS2, a polarized reflective sheet OS3 and a louver film OS4 are used. Each optical sheet 34 is rectangular, having substantially the same dimensions, is stacked on the first main surface S1 of the lightguide plate 30 in order, and is curved along the first main surface S1. As described later, the four optical sheets 34 engage with the sidewalls 24*c* of the inner frame 24, and are secured at predetermined positions.

The outer frame 36 comprises a rectangular frame portion 37 and four sidewalls 38 standing along the respective sides of the frame portion, and is formed of, for example, synthetic resin. The portions of the long sides of the frame portion 37 are curved so as to be concave toward the base frame 22 with a curvature substantially equal to that of the liquid crystal display panel 12. The outer frame 36 covers the base frame 22 and is fitted with the external side of the base frame 22. The frame portion 37 covers the peripheral portions of the lightguide plate 30 and the optical sheets 34. This structure allows the structural elements of the planar illuminating device 20 to be provided and retained inside the base frame 22.

Figure 4A:
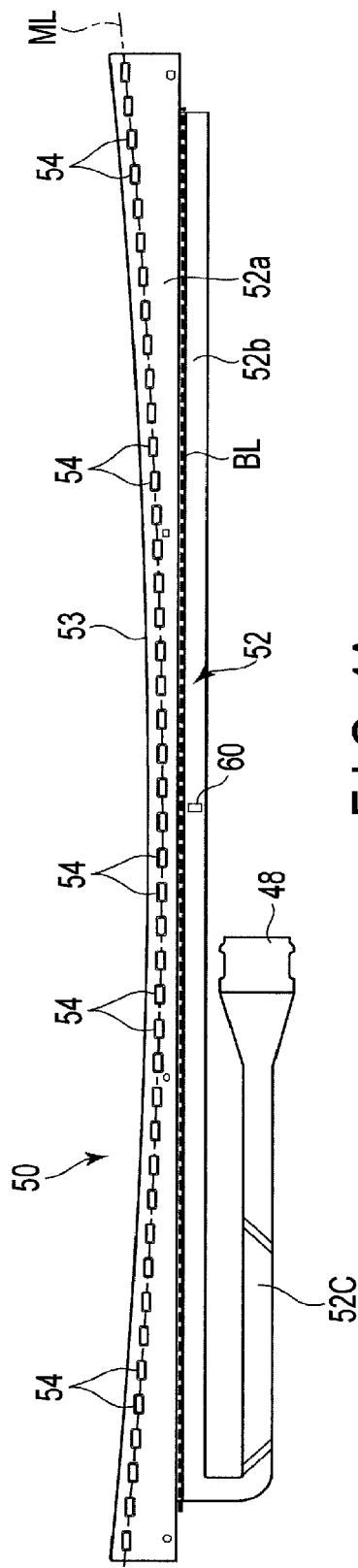
FIG. 4A is a side view showing a printed circuit board on which a plurality of light sources of the planar illuminating device are mounted.
Figure 4B:
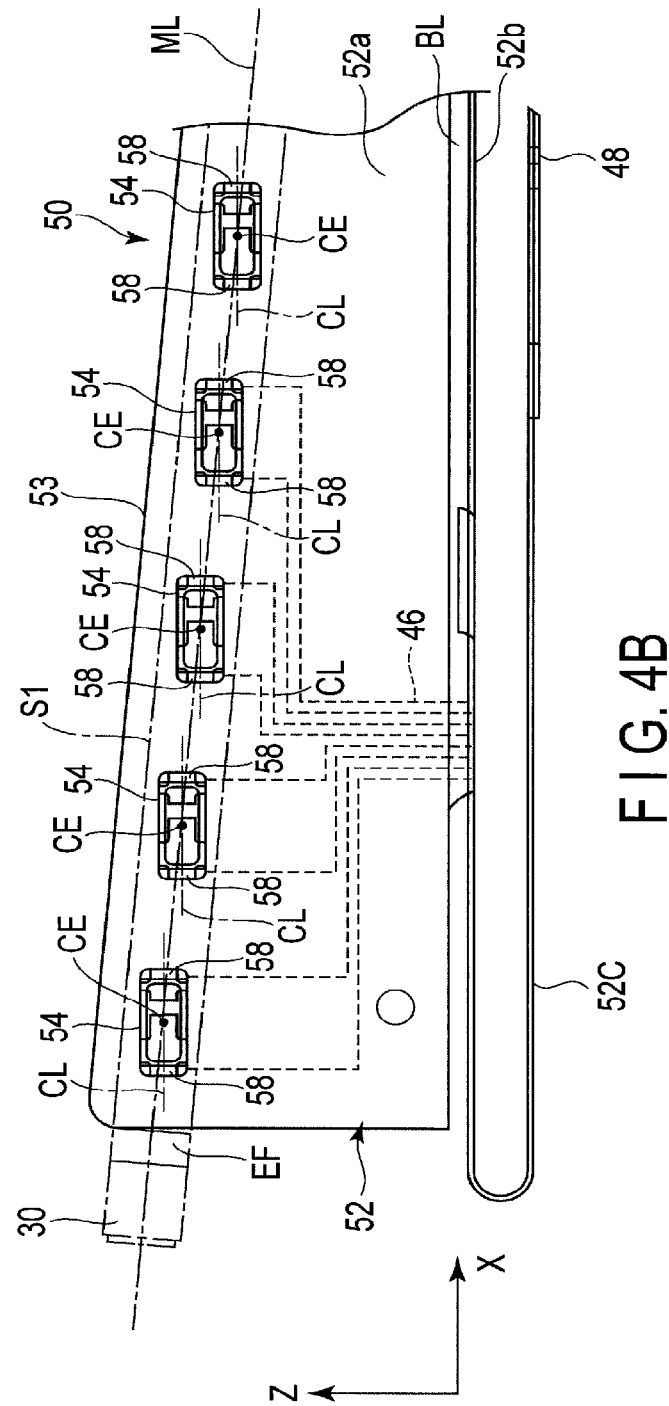
FIG. 4B is a side view in which a part of the printed circuit board is enlarged.

FIG. 4A is a plan view in which each light source unit is expanded. FIG. 4B is a side view in which a part of the light source unit is enlarged.

The light source unit 50 comprises a flexible printed circuit (FPC) 52 in the form of a slender band as a mounting substrate, a plurality of light sources mounted on the FPC 52, for example, light-emitting diodes (LEDs) 54, and a thermistor (temperature detector) 60 mounted on the FPC 52 in order to detect the temperature of the light source unit 50. The FPC 52 comprises a mounting portion 52a in the form of a slender band having a length substantially equal to that of the incidence surface EF of the lightguide plate 30, a band-like thermal dissipation portion 52b which is continuous with and extends parallel to the mounting portion 52a, and a band-shaped connecting portion 52c extending from one end of the thermal dissipation portion 52b in the longitudinal direction. A connector 48 is attached to the extension end of the connecting portion 52c. The FPC 52 is folded along the linear folding line BL located between the mounting portion 52a and the thermal dissipation portion 52b. The mounting portion 52a is provided substantially at right angles to the thermal dissipation portion 52b.

The mounting portion 52a comprises a side edge 53 facing the folding line BL. The side edge 53 is curved in an arc-shape so as to be concave toward the folding line BL with, for example, a curvature substantially equal to that of the lightguide plate 30. In this manner, the mounting portion 52a is formed so as to be narrowest in the central portion in the longitudinal direction and widest at both ends in the longitudinal direction.

The LEDs 54 are mounted in the mounting portion 52a, and are arranged with a predetermined pitch along the curved side edge 53 from one end to the other end of the mounting portion 52a in the longitudinal direction. Each LED 54 is, for example, rectangular. Each LED 54 comprises a light-emitting center CE, a central axis CL passing through the light-emitting center CE in the longitudinal direction, and a pair of connection pads (connection terminals) 58 which are located on the central axis CL and are connected to the mounting portion 52a of the FPC 52. The LEDs 54 are provided such that the light-emitting centers CE are located on a virtual mounting line ML. The virtual mounting line ML is curved in an arc-shape and extends parallel to the side edge 53 of the FPC 52. Further, the LEDs 54 are arranged such that their central axes CL are parallel to each other and intersect with the virtual mounting line ML. In the present embodiment, the LEDs 54 are mounted and provided such that their central axes CL are parallel to the folding line BL of the FPC 52, in other words, their central axes CL are parallel to the longitudinal direction of the mounting portion 52a.

The light-emitting centers CE may be determined by optical measurement. However, to simplify the structure, each light-emitting center CE may be defined as the barycenter of the light-emitting surface of the LED 54 (in other words, the center of the area), the barycenter of the surface of the LED 54 facing the incidence surface EF of the lightguide plate 30 (in other words, the center of the area), or the position of an anode inside the LED 54.

The thermistor 60 is mounted in the central portion of the thermal dissipation portion 52b of the FPC 52 in the longitudinal direction, and is located near the central portion of the mounting portion 52a in the longitudinal direction, in other words, near the narrowest portion of the mounting portion 52a. The portion caused to have the highest temperature by the emission of light from the LEDs 54 is considered as the vicinity of the central portion of the mounting portion 52a in the longitudinal direction. The thermistor 60 is provided so as to detect the temperature of the portion having the highest temperature.

FIG. 4B shows the layout relationship between the incidence surface EF of the lightguide plate 30 and the LEDs 54. The virtual mounting line ML faces the center of the lightguide plate 30 in the thickness direction. The light-emitting center CE of each LED 54 faces the center of the incidence surface EF in the width direction. The light-emitting surface of each LED 54 is fitted within the thickness of the lightguide plate 30, in other words, within the incidence surface EF. The LEDs 54 are arranged in the above manner. Thus, even when the lightguide plate 30 is curved, its light distribution property can be substantially the same as that of a flat lightguide plate. The optical pattern of the lightguide plate 30 (including the design) can be also the same as that of a flat lightguide plate.

The LEDs 54 are arranged along the curved virtual mounting line ML. The LEDs 54 are provided such that their central axes CL are parallel to each other, here, such that their central axes CL are parallel to the folding line BL. Thus, the LEDs 54 are arranged such that they all have the same inclination and all face the same way. The LEDs 54 are provided horizontally or perpendicularly. Thus, the design of the wirings connecting the FPC 52 to the LEDs 54 can be simplified and made efficient.

FIG. 5 is a cross-sectional view of the FPC 52 and schematically shows an example of the stacked structure of the FPC 52. As shown in the figure, the FPC 52 comprises an insulating base film BF formed of polyimide, etc. For example, a conductive layer Cu1 formed of electrolytic copper foil, a plated layer MH1 formed of electrolyte copper, a thermal cure adhesive layer AD1 and a cover film CF1 formed of polyimide, etc., are stacked on one surface of the base film BF in order. The conductive layer Cu1 is patterned so as to form a plurality of wirings. A connection terminal CNT bonded to each connection pad 58 of each LED 54 comprises a through-hole TH1 in the cover film CF1 and the adhesive layer AD1. A nickel underlayer UL1 and an electrolytic gold-plated layer Au1 are stacked in the through-hole TH1. Each connection pad 58 of each LED 54 is bonded to the electrolytic gold-plated layer Au1 by solder, a conductive adhesive, etc.

A pair of connection terminals CNT is formed in the portion in which the LED 54 is mounted such that the pair of connection terminals CNT corresponds to the connection pads 58. The connection terminals CNT are connected to the connector 48 via wirings 46 formed on the FPC 52. The LEDs 54 light up by the source voltage supplied from the connector 48.

For example, a conductive layer Cu2 formed of special electrolytic copper foil, a plated layer MH2 formed of electrolyte copper, a thermal cure adhesive layer AD2 and a cover film CF2 formed of polyimide are stacked on the other surface of the base film BF in order. The conductive layer Cu2 is patterned so as to form a plurality of wirings. A plurality of through-holes (not shown) are formed in the base film BF. These through-holes electrically connect the wirings of the upper layers to the wirings of the lower layers.

The total thickness T of the FPC 52 is, for example, approximately 148 μm. The film thickness of the base film BF is 25 μm. The film thickness of the conductive layers Cu1 and Cu2 is 18 μm. The film thickness of the plated layers MH1 and MH2 is 6 μm. The film thickness of the adhesive layers AD1 and AD2 is 25 μm. The film thickness of the cover films CF1 and CF2 is 12.5 μm. The cover films CF1 and CF2 are preferably formed so as to be sufficiently thinner than the base film BF, for example, so as to have a film thickness of approximately 30 to 85% of that of the base film BF. In the present embodiment, the film thickness of the cover films CF1 and CF2 is 50% of that of the base film BF. As the cover films CF1 and CF2 are thin, the heat transfer resistance of the cover films can be reduced. Thus, the thermal dissipation property of the FPC 52 can be improved. The base film BF can transfer heat through a plurality of through-holes. Thus, the heat transfer resistance can be low.

FIG. 6 is a cross-sectional view of the planar illuminating device along the line A-A of FIG. 2. In other words, FIG. 6 is a cross-sectional view of the planar illuminating device in the Y-direction. As shown in FIG. 3 and FIG. 6, the lightguide plate 30 comprises protrusions 31 used to determine the position. The protrusions 31 protrude from the respective longitudinal ends of each incidence surface EF. With the lightguide plate 30 provided inside the base frame 22, the protrusions 31 are directly in contact with or adjacent to the inner surfaces of the sidewalls 22b of the base frame 22. Thus, the incidence surfaces EF of the lightguide plate 30 face the inner surfaces of the sidewalls 22b across an intervening predetermined space.

The light source unit 50 is provided inside the base frame 22 in a state where the FPC 52 is folded such that the mounting portion 52a is substantially at right angles to the thermal dissipation portion 52b. The mounting portion 52a is provided between the incidence surface EF of the lightguide plate 30 and the sidewall 22b, and is attached to the inner surface of the sidewall 22b by a double-sided tape 62a having thermal conductivity or an adhesive having thermal conductivity. In this manner, the LEDs 54 are provided so as to be adjacent to and face the incidence surface EF of the lightguide plate 30 (see FIG. 4A). The thermal dissipation portion 52b of the FPC 52 is provided on the bottom wall 22a of the base frame 22, and is attached to the bottom wall 22a by a double-sided tape 62b having thermal conductivity or an adhesive having thermal conductivity. The connector 48 of the light source unit 50 is connected to the substrate of a drive circuit (not shown).

The other light source unit 50 is also provided inside the base frame 22 by the same structure and attaching mechanism as the above, and faces the other incidence surface EF of the lightguide plate 30.

The light emitted from the LEDs 54 of the light source units 50 enters the lightguide plate 30 through both incidence surfaces EF of the lightguide plate 30. The light is transmitted through the lightguide plate 30 and exits through the entire emitting surface S1 to the liquid crystal display panel 12 side. The emitted light is diffused by the optical sheets 34. Subsequently, the light illuminates the liquid crystal display panel 12.

The heat produced by the emission of light of the LEDs 54 is dissipated (released) to the sidewalls 22b of the base frame 22 through the mounting portion 52a of each FPC 52 and the double-sided tape 62a. The heat is partially dissipated to the bottom wall 22a of the base frame 22 through the thermal dissipation portion 52b of each FPC 52 and the double-sided tape 62b.

As described above, the FPC 52 of each light source unit 50 comprises the mounting portion 52a and the thermal dissipation portion 52b. This structure enables the FPC 52 to be enlarged. Thus, the path of wirings can be assured, and the thermal dissipation area can be increased. In this manner, it is possible to mount the thermistor 60 on each FPC 52 and provide the thermistor 60 near the narrowest portion of the mounting portion 52a. Moreover, each FPC 52 is provided in the base frame 22 such that the FPC 52 is folded in an L-shape. Thus, the heat of each FPC 52 can be dissipated from the sidewalls 22b of the metal base frame 22 as well as the bottom wall 22a.

In the stacked structure (CF/Cu/BF/Cu/CF) of each FPC 52, the thickness of each layer is optimized. For example, the thickness of each cover film in which the heat transfer resistance is high is reduced. In this manner, the thermal dissipation property of each FPC 52 can be improved. Because of these factors, the heat produced by the LEDs 54 can be dissipated or released efficiently to the metal base frame 22. Thus, the increase in the temperature of the light source units 50 can be prevented.

As shown in FIG. 6, the outer frame 36 integrally comprises a rib 64 protruding from the inner surface of the frame portion 37. The rib 64 extends along the long sides of the frame portion 37 over substantially the entire length of the long sides. The rib 64 protrudes to the vicinity of the emitting surface S1 of the lightguide plate 30, and faces the side edge portion of the emitting surface S1. A reflective tape (reflective layer) 66 is attached to the protrusion end surface of the rib 64, and faces the side edge portion of the lightguide plate 30.

The rib 64 faces a side edge (for example, the lower edge) of the optical sheets 34 such that the rib 64 is allowed to be directly in contact with the side edge of the optical sheets 34. When the optical sheets 34 are displaced, the rib 64 is directly in contact with the side edge of the optical sheets 34 in order to prevent the optical sheets 34 from deviating excessively (in other words, from dropping) toward the LEDs 54. The reflective tape 66 attached to the rib 64 has a function of reflecting light leaking from the side edge portion of the emitting surface S1 of the lightguide plate 30 and returning the light to the inside of the lightguide plate 30. In this manner, the luminance loss of the lightguide plate 30 can be reduced.

As shown in FIG. 6, the reflective sheet 26 located under the lightguide plate 30 extends to the LED 54 side in comparison with the incidence surface EF of the lightguide plate 30. Thus, the reflective sheet 26 reflects the light leaking from the gap (clearance) between the LED 54 and the lightguide plate 30 and returns the light to the inside of the lightguide plate 30. In this manner, the reflective sheet 26 reduces the luminance loss of the illuminating device 20 and the lightguide plate 30.

Figure 7:
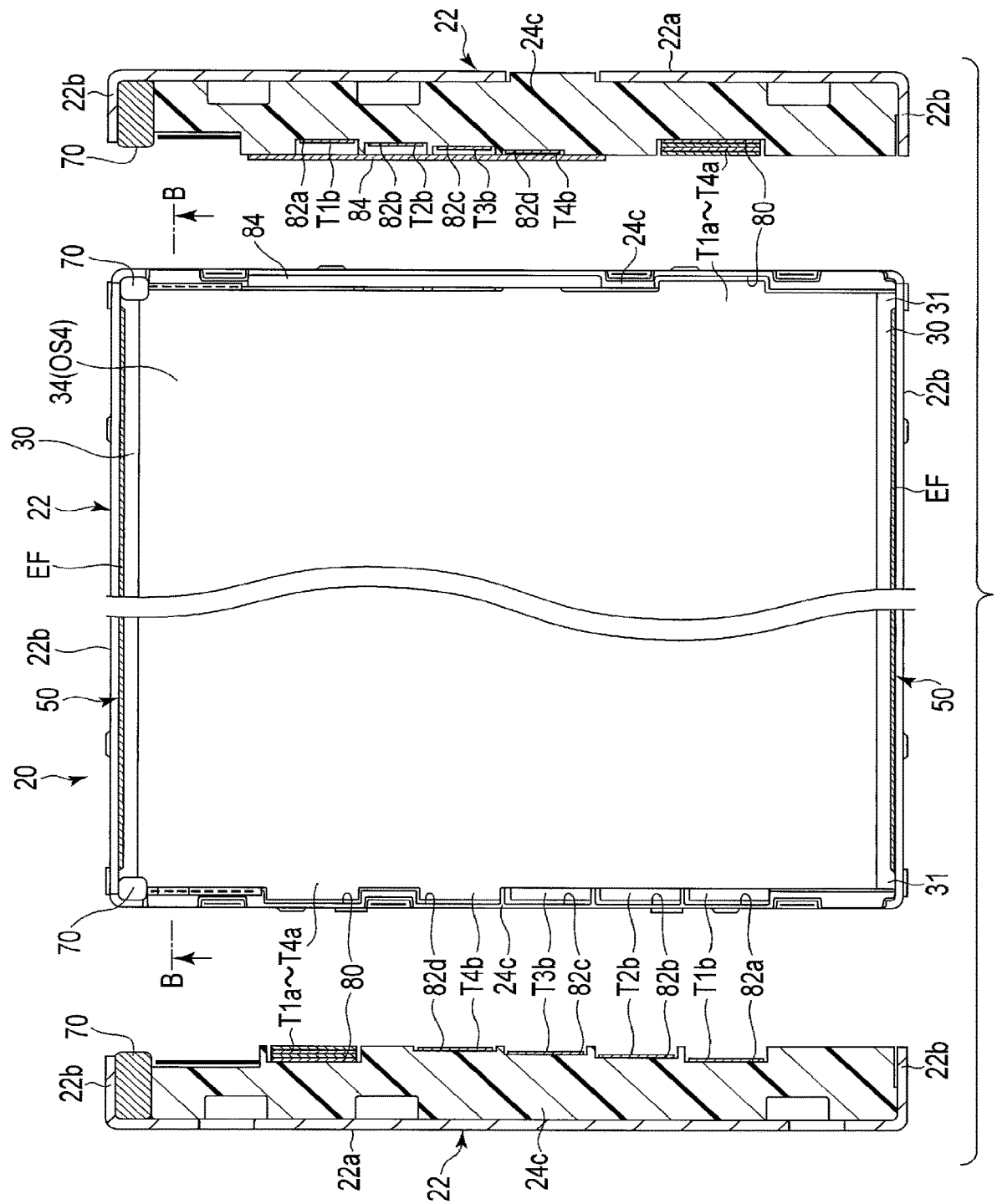
FIG. 7 shows a plan view of the planar illuminating device and cross-sectional views of short-side portions.

FIG. 7 shows a plan view of the planar illuminating device from which the outer frame is removed, and cross-sectional views of short-side portions of the planar illuminating device. FIG. 8 is a plan view in which two corner portions of the planar illuminating device are enlarged. FIG. 9 is a perspective view showing a corner portion of the planar illuminating device.

As shown in FIG. 7, FIG. 8 and FIG. 9, a buffer member 70 is attached to each of two adjacent corner portions of the base frame 22, for example, each of the corner portions of both ends of the upper long side. Each buffer member 70 is of an elastic material such as rubber or silicon in, for example, substantially the form of a prism. In the corner portion of the base frame 22, each buffer member 70 is directly in contact with the inner surfaces of the bottom wall 22a and the sidewalls 22c and 22b of the base frame 22.

In the inner frame 24, the reflective sheet 26, the lightguide plate 30 and the optical sheets 34, each of the two corner portions corresponding to the buffer members 70 is cut out, and forms cutout portions 24t, 26t, 30t and 34t having a shape corresponding to each buffer member 70 (see FIG. 3). The dimensions and shape of each cutout portion 24t of the inner frame 24 are such that the clearance with respect to the buffer member 70 is substantially zero. The cutout surface of each cutout portion 24$t$ is directly in contact with the sidewall of the buffer member 70. The dimensions and shape of each cutout portion 26$t$ of the reflective sheet 26 and each cutout portion 34$t$ of each optical sheet 34 are such that there is a predetermined clearance with respect to the buffer member 70.

The dimensions and shape of each cutout portion 30$t$ of the lightguide plate 30 are such that the clearance is negative with respect to the buffer member 70. The cutout surface defining each cutout portion 30$t$ of the lightguide plate 30 is formed so as to be directly in contact with and dig into the buffer member 70. Moreover, the cutout surface includes, for example, a C-plane cut surface, or an inclined surface inclining with respect to the X- and Y-directions. With the lightguide plate 30 provided inside the base frame 22, the cutout surfaces of a pair of cutout portions 30$t$ are directly in contact with and dig into the respective buffer members 70. Thus, the two buffer members 70 press the lightguide plate 30 in a direction in which the X-direction is combined with the Y-direction, in other words, in the direction of the center of the lightguide plate 30, by the own elasticity. The protrusions 31 provided at both ends of the other long side of the lightguide plate 30 to determine the position are pressed toward the sidewall 22$b$ of the base frame 22 by the pressing force of the buffer members 70.

As the lightguide plate 30 is elastically pressed and retained by the two buffer members 70, it is possible to eliminate the backlash of the lightguide plate 30 because of oscillation. At the same time, the sounds of backlash can be prevented. If at least two buffer members 70 are provided in the corner portions of the base frame 22, the above effect of preventing backlash can be obtained. In this manner, the number of buffer members 70 can be reduced. At the same time, the corner portions of the base frame 22, which are the dead space, are utilized as a place for providing the buffer members 70. Thus, the installation space in the base frame can be efficiently used. The frame of the planar illuminating device can be reduced in size.

The buffer members 70 are not limited to the form of a prism, and may take various other forms such as a cylinder. The elasticity or hardness of the buffer members 70 may be arbitrarily determined in accordance with the dimensions of the lightguide plate 30 or the environment in which oscillation is produced.

Figure 10:
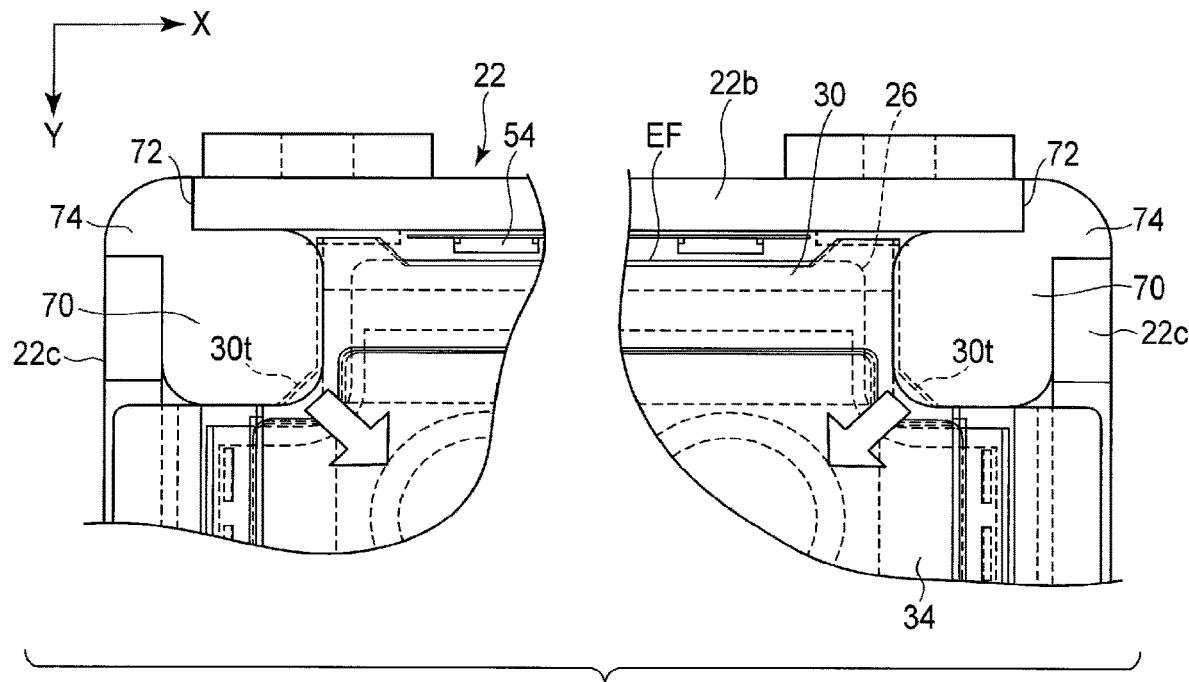
FIG. 10 is a plan view in which corner portions of the planar illuminating device are enlarged according to a first modification example.

FIG. 10 is a plan view in which a pair of corner portions of the planar illuminating device are enlarged according to a modification example. In the modification example, the base frame 22 is formed by folding a metal plate. In each of the corner portions, a cutout 72 or a gap is present between the sidewall 22$b$ standing along the long side and the sidewall 22$c$ standing along the short side. In this case, each of the buffer members 70 mounted in the corner portions of the base frame 22 may integrally comprise a protrusion 74 which engages with and blocks the cutout 72. In this manner, the protrusion 74 of each buffer member 70 blocks the cutout 72. Thus, it is possible to prevent the incursion of a foreign substance passing through the cutout 72. In general, a seal-up tape is needed to block the cutout 72. However, the modification example does not need such a seal-up tape. Thus, the manufacturing process can be simplified.

This specification returns to the explanation of the structure of the planar illuminating device 20 of the present embodiment. As shown in FIG. 3 and FIG. 7, the optical sheets OS1 to OS4 comprise rectangular first tabs T1$a$, T2$a$, T3$a$ and T4$a$, respectively, and second tabs T1$b$, T2$b$, T3$b$ and T4$b$, respectively, to determine the positions. These tabs protrude from the respective side edges of the short sides. The first tabs T1$a$, T2$a$, T3$a$ and T4$a$ of the optical sheets OS1 to OS4 are provided at the same position in the direction of the short sides of the optical sheets (in other words, in the Y-direction). The first tabs T1$a$, T2$a$, T3$a$ and T4$a$ are provided at positions so as to overlap with each other. In contrast, the second tabs T1$b$, T2$b$, T3$b$ and T4$b$ of the optical sheets OS1 to OS4 are provided at positions different from each other in the direction of the short sides of the optical sheets, in other words, at positions which deviate from each other only by a predetermined interval in the direction of the short sides, such that they do not overlap with each other.

In the present embodiment, in one of the short sides of the respective optical sheets OS1 to OS4, the first tabs T1$a$, T2$a$, T3$a$ and T4$a$ are provided near one end of the respective short sides. The second tab T1$b$ of the lowest optical sheet OS1 is provided near the other end of the short side so as to be the most farthest from the first tab T1$a$. The second tabs T2$b$, T3$b$ and T4$b$ of the optical sheets OS2, OS3 and OS4 are provided at different positions in order toward the first tabs.

The first tabs T1$a$ to T4$a$ and the second tabs T1$b$ to T4$b$ on one short side of the respective optical sheets OS1 to OS4 and the first and second tabs on the other short side are symmetrical with respect to the central point of the optical sheets 34.

Five recesses are formed on the upper surface of the sidewall 24$c$ of each short side of the inner frame 24. The five recesses are a common recess 80 which engages with the first tabs of the optical sheets OS1 to OS4, a first recess 82$a$, a second recess 82$b$, a third recess 82$c$ and a fourth recess 82$d$. The first to fourth recesses 82$a$ to 82$d$ engage with the second tabs of the optical sheets OS1 to OS4, respectively. The common recess 80 is provided near one end of each sidewall 24$c$, and has a depth such that the first tabs T1$a$ to T4$a$ of the four optical sheets OS1 to OS4 can be housed in a state where they are piled up. The first recess 82$a$ is provided near the other end of each sidewall 24$c$, and has a depth corresponding to the height position of the lowest optical sheet OS1. The second recess 82$b$, the third recess 82$c$ and the fourth recess 82$d$ are arranged in order from the first recess 82$a$ side to the common recess 80 side. The second recess 82$b$, the third recess 82$c$ and the fourth recess 82$d$ are provided so as to have depths corresponding to the height positions of the optical sheets OS2, OS3 and OS4, respectively. The first recess 82$a$ is deepest. The second recess 82$b$, the third recess 82$c$ and the fourth recess 82$d$ get shallower gradually in this order. In other words, the first recess 82$a$, the second recess 82$b$, the third recess 82$c$ and the fourth recess 82$d$ are formed so as to have steps in stages.

The common recess 80, the first recess 82$a$, the second recess 82$b$, the third recess 82$c$ and the fourth recess 82$d$ are open on the upper surface and the inner surface of each sidewall 24$c$. The external surface side of each sidewall 24$c$ is closed by the sidewall 24$c$. Adjacent recesses are partitioned by partition walls formed by each sidewall 24$c$.

As shown in FIG. 7, the optical sheets OS1, OS2, OS3 and OS4 are stacked on the emitting surface S1 of the lightguide plate 30. The first tabs T1$a$ to T4$a$ of the optical sheets engage with the common recess 80 of the inner frame 24, and are housed in the common recess 80 such that they are piled up. The second tabs T1$b$, T2$b$, T3$b$ and T4$b$ of the optical sheets OS1, OS2, OS3 and OS4 engage with the first recess 82$a$, the second recess 82$b$, the third recess 82$c$ and the fourth recess 82$d$ of the inner frame 24, respectively. One second tab is housed in one recess. A slender tape 84 is attached to the upper surface of one of the sidewalls 24c in order to secure the first and second tabs of the optical sheets to the sidewall 24c in a lump.

In the above structure, a plurality of recesses are provided in each sidewall 24c. Only the second tab of one type of optical sheet engages with each recess. Thus, if the state of engagement between each recess and each second tab is visually recognized, it is possible to easily confirm whether the positions of a plurality of optical sheets are determined properly, or whether a predetermined number of optical sheets are stacked properly. It is possible to eliminate the backlash of the optical sheets in the thickness direction by conforming the depth (the height of the bottom surface) of each of the first to fourth recesses to the height of the corresponding optical sheet on the bottom surface side. Moreover, a partition wall is provided between adjacent recesses. Thus, when the tape 84 is attached to the upper surface of the sidewall 24c, it is possible to ensure a large area for attaching the tape 84 to the sidewall 24c. In this manner, attachment is assured.

The number of optical sheets 34 is not limited to four, and may be increased or decreased as necessary. In the present embodiment, each optical sheet comprises the first tab and the second tab. However, when a small optical sheet is employed, the first tab may be omitted, and thus, only the second tab may be provided.

Figure 11:
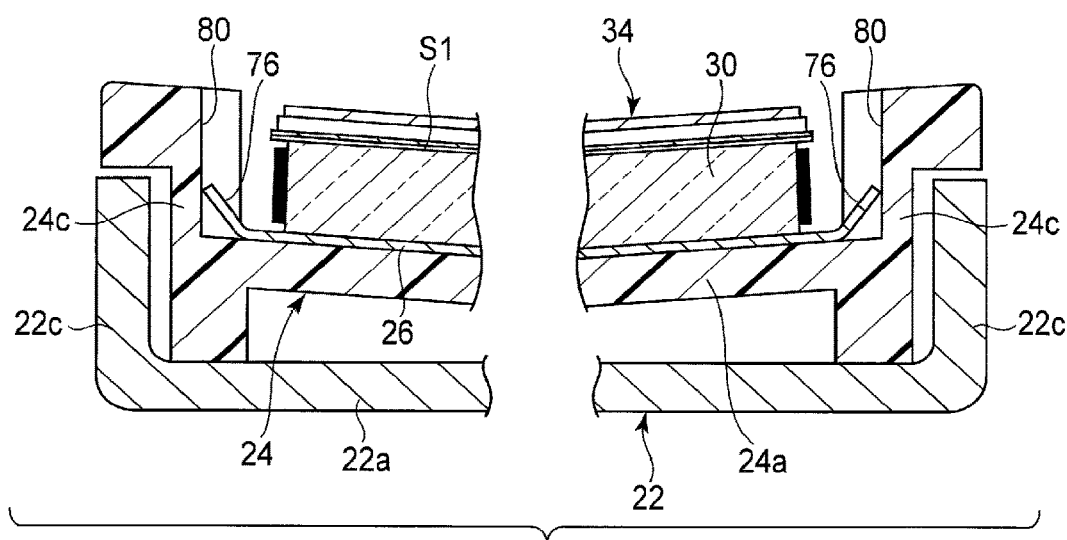
FIG. 11 is a cross-sectional view of the planar illuminating device taken along the line B-B of FIG. 7.

FIG. 11 is a cross-sectional view of the planar illuminating device along the line B-B of FIG. 7. As shown in FIG. 11 and FIG. 9, the reflective sheet 26 placed on the inner frame 24 comprises a rectangular tab 76 which protrudes from each short side in order to determine the position. A perforation 77 is formed at the base end of each tab 76 along the boundary with the short side of the reflective sheet 26. Each tab 76 is folded at the position of the perforation 77 toward the upper side, in other words, toward the lightguide plate 30 side. At this time, each tab 76 is not folded to the position perpendicular to the reflective sheet 26. Each tab 76 is folded at an angle of less than 90°.

On the inner surface of each sidewall 24c of the inner frame 24, the rectangular recess 80 used to determine the position is formed at a position facing the tab 76 of the reflective sheet 26. Each of the two tabs 76 of the reflective sheet 26 engages with the opposite recess 80 of the sidewall 24c, and is directly in contact with the bottom wall of the recess 80, in other words, the inner surface of the sidewall 24c. Thus, the two tabs 76 engage with the recesses 80 of the sidewalls 24c. In this manner, the reflective sheet 26 is retained at a predetermined position securely.

The tabs 76 have a spring property since they are folded. Thus, even when the reflective sheet 26 is thermally expanded, it is possible to absorb the thermal expansion of the reflective sheet as a whole by the elastic deformation of the tabs 76. In this manner, the shift of the position of the reflective sheet can be prevented. Moreover, when the tabs 76 are folded, the protrusion of the tabs from the reflective sheet 26 can be small in comparison with when the tabs 76 are not folded. As a result, the size of the frame of the illuminating device can be reduced.

The number of tabs 76 used to determine the position is not limited to one for each short side. A plurality of tabs 76 may be provided for each short side.

The planar illuminating device 20 having the above structure is provided on the rear side of the liquid crystal display panel 12 so as to face the liquid crystal display panel 12 by securing the frame portion 37 of the outer frame 36 to the circumferential portion of the rear surface of the liquid crystal display panel 12. To secure the outer frame 36 to the liquid crystal display panel 12, for example, a double-sided tape, a hot-melt adhesive, an epoxy adhesive or a UV curing adhesive may be used.

According to the above embodiments, it is possible to provide a planar illuminating device suitable for a curved display device, and a curved display device comprising the planar illuminating device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures which can be implemented by a person of ordinary skill in the art through arbitrary design changes to the structures described above as embodiments of the present invention come within the scope of the present invention as long as they are in keeping with the spirit of the present invention. For example, the structure of the lightguide plate of the illuminating device is not limited to the structure comprising two incidence surfaces facing each other. Instead of this structure, only one side surface may be formed as an incidence surface. Further, only one light source unit may be provided. The emitting surface of the lightguide plate is not limited to a curved surface which is concave in the longitudinal direction. The emitting surface may be a curved surface which is convex in the longitudinal direction. In this case, the illuminating device may be applied to a curved display device which is convex on the display side.

The structural elements of the liquid crystal display panel and the planar illuminating device are not limited to being rectangular, and may be other shapes such as an ellipse or a truck. The curvature of the curved emitting surface of the lightguide plate is not limited to the same curvature over the entire surface, and may differ between the central portion and both end portions in the longitudinal direction. The materials of the structural elements are not limited to the above examples, and may be various other materials.

In addition, other effects which can be obtained by the above embodiments and are self-evident from the description in this specification or can be arbitrarily conceived by a person of ordinary skill in the art are considered to be achievable by the present invention as a matter of course.

What is claimed is:

1. A display device comprising:
   a display panel including a curved surface,
   a lightguide plate including a curved emitting surface, and
      an incidence surface comprising a side edge curved along the emitting surface;
   a printed circuit board facing the incidence surface; and
   a plurality of light sources which are mounted on the printed circuit board and emit light to the incidence surface, wherein
   each of the light sources comprises a light-emitting center, a pair of connection terminals connected to the printed circuit board, and a central axis extending through the connection terminals and the light-emitting center,
   the light sources are arranged along a curved mounting line extending along the curved side edge of the incidence surface on the printed circuit board, such that the light-emitting centers are located on the mounting line, and such that the central axes are parallel to each other and are located in a direction intersecting with the mounting line, and a distance from one of the pair of connection terminals to the curved side edge is shorter than that from the other of the pair of connection terminals to the curved side edge.

2. The display device of claim 1, wherein
the printed circuit board comprises:
a mounting portion which faces the incidence surface and is mounted with the light sources; and
a thermal dissipation portion folded with respect to the mounting portion along a linear folding line.

3. The display device of claim 2, wherein
the mounting portion of the printed circuit board comprises a side edge opposing the folding line across an intervening space and curved along the side edge of the incidence surface, and
the light sources are arranged such that the central axes are parallel to the folding line.

4. The display device of claim 3, further comprising a metal base frame comprising:
a bottom wall; and
a plurality of sidewalls standing along side edges of the bottom wall, wherein
the lightguide plate is provided inside the base frame, and the incidence surface faces an inner surface of one of the sidewalls of the base frame,
the mounting portion of the printed circuit board is provided between the incidence surface of the lightguide plate and the one of the sidewalls of the base frame, and is attached to the inner surface of the one of the sidewalls of the base frame, and
the thermal dissipation portion faces the bottom wall, and is attached to the bottom wall.

5. The display device of claim 2, further comprising a detector which is mounted on the thermal dissipation portion of the printed circuit board and configured to detect a temperature of the printed circuit board.

6. The display device of claim 1, wherein
the printed circuit board comprises a base film, a conductive layer which is stacked on each surface of the base film and constitutes wirings, and a cover film which covers each of the conductive layers, and
the cover film has a thickness of 30 to 85% of a thickness of the base film.

7. The display device of claim 4, further comprising two flexible buffer members which are mounted on two adjacent corner portions of the base frame, respectively, and press two corresponding corner portions of the lightguide plate toward a central portion of the lightguide plate.

8. The display device of claim 7, wherein
the lightguide plate comprises a cutout portion provided in each of the two corner portions, the cutout portion comprising a C-shaped cutout surface or a cutout surface including an inclined surface inclining with respect to two directions perpendicular to each other, and
the cutout surfaces dig into the respective buffer members and are directly in contact with the respective buffer members.

9. The display device of claim 7, wherein
the base frame comprises a gap or cutout provided between adjacent sidewalls in a corner portion, and each of the buffer members integrally comprises a protrusion which blocks the gap or cutout between the sidewalls in the corner portion.

10. The display device of claim 4, further comprising:
an inner frame which is provided inside the base frame and comprises:
a support plate comprising a curved support surface; and
two sidewalls standing along two opposite side edges of the support plate; and
a rectangular reflective sheet placed on the support surface, wherein
the lightguide plate is placed on the reflective sheet,
the reflective sheet comprises a tab which protrudes from each of two opposite side edges in order to determine a position,
the tabs are folded toward a lightguide plate side along the side edges of the reflective sheet, and are directly in contact with inner surfaces of the sidewalls of the inner frame.

11. The display device of claim 10, further comprising a plurality of rectangular optical sheets stacked on the emitting surface of the lightguide plate, wherein
the inner frame comprises a plurality of recesses on an upper surface of each of the sidewalls, and the recesses are arranged in a longitudinal direction of the sidewalls and have different depths,
each of the optical sheets comprises a tab which protrudes from a side edge in order to determine a position, and the tabs engage with the recesses one by one.

12. The display device of claim 11, wherein
the tabs of the optical sheets are provided so as to deviate from each other in a direction along the side edges of the optical sheets, and
each of the recesses has a depth conforming to a height of the corresponding optical sheet in a stacked direction of the optical sheets.

13. The display device of claim 11, further comprising
an outer frame which comprises a rectangular frame portion and a plurality of sidewalls standing along side edges of the frame portion, and is fitted with the sidewalls of the base frame such that a circumferential portion of the optical sheets is covered by the frame portion, wherein
the outer frame further comprises:
a rib which protrudes from an inner surface of the frame portion to the lightguide plate near the light sources, and extends along one sidewall; and
a reflective layer which is provided at a protrusion end of the rib and faces a circumferential portion of the lightguide plate.

14. A display device comprising:
a display panel including a curved surface;
a plurality of light sources;
a circuit board on which the light sources are mounted; and
a lightguide plate comprising an incidence surface which light from the light sources enters, and an emitting surface through which the illuminated light exits, wherein
the emitting surface has a curved shape,
the incidence surface is adjacent to the emitting surface,
a boundary between the incidence surface and the emitting surface forms a curved line along the curved shape,
the circuit board comprises a plurality of connecting portions electrically connected to the light sources,
the connecting portions comprise a pair of connection terminals, the connecting portions are arranged along the curved line, the pair of connection terminals is not arranged along the curved line, and a distance from one of the pair of connection terminals to the curved line is shorter than that from the other of the pair of connection terminals to the curved line.

15. The display device of claim 14, wherein the circuit board is folded so as to be separated into a first portion and a second portion, the first portion faces the incidence surface, and a boundary between the first portion and the second portion is a straight line.

16. The display device of claim 15, wherein the first portion comprises an edge along the curved line, and the pair of connection terminals is arranged parallel to the straight line.

17. The display device of claim 15, further comprising a storage portion comprising:

a bottom wall; and a plurality of sidewalls intersecting with the bottom wall, wherein the lightguide plate is provided in the storage portion, the incidence surface faces an inner surface of one of the sidewalls of the storage portion, the first portion is provided between the incidence surface of the lightguide plate and the one of the sidewalls of the storage portion, and is attached to the inner surface of the one of the sidewalls of the storage portion, and the second portion faces the bottom wall.

18. The display device of claim 15, further comprising a detector provided at the first portion and configured to detect a temperature.

* * * * *